US008022367B2

(12) United States Patent
Finch et al.

(10) Patent No.: US 8,022,367 B2
(45) Date of Patent: Sep. 20, 2011

(54) MULTIPOINT SENSING SYSTEM

(75) Inventors: John Gerard Finch, Livonia, MI (US); Jian Xu, Windsor (CA)

(73) Assignee: Liberty Hardware Mfg. Corp., Winston-Salem, NC (US)

( * ) Notice: Subject to any disclaimer, the term of this patent is extended or adjusted under 35 U.S.C. 154(b) by 30 days.

(21) Appl. No.: 12/469,787

(22) Filed: May 21, 2009

(65) Prior Publication Data

US 2010/0294937 A1 Nov. 25, 2010

(51) Int. Cl.
*G01J 5/02* (2006.01)

(52) U.S. Cl. .......... 250/340

(58) Field of Classification Search .......... 250/338.1, 250/339.01, 339.14, 340
See application file for complete search history.

(56) References Cited

U.S. PATENT DOCUMENTS

| | | | | |
|---|---|---|---|---|
| 4,982,176 | A * | 1/1991 | Schwarz | 340/567 |
| 5,452,419 | A | 9/1995 | Di Giulio et al. | |
| 5,487,234 | A | 1/1996 | Dragon | |
| 5,914,655 | A * | 6/1999 | Clifton et al. | 340/506 |
| 6,120,165 | A * | 9/2000 | Shalvi | 362/276 |
| 6,188,146 | B1 * | 2/2001 | Michaels | 307/150 |
| 6,226,031 | B1 | 5/2001 | Barraclough et al. | |
| 6,405,049 | B2 | 6/2002 | Herrod et al. | |
| 6,668,656 | B2 | 12/2003 | Fernald et al. | |
| 6,721,283 | B1 | 4/2004 | Marino et al. | |
| 6,930,959 | B2 | 8/2005 | Narayanaswami | |
| 6,944,226 | B1 | 9/2005 | Lin et al. | |
| 7,174,769 | B2 | 2/2007 | McSheffrey, Jr. et al. | |
| 7,327,258 | B2 | 2/2008 | Fast et al. | |
| 7,495,553 | B2 | 2/2009 | Parker et al. | |
| 2003/0128130 | A1 * | 7/2003 | Kao | 340/693.1 |
| 2004/0129883 | A1 * | 7/2004 | Dougherty et al. | 250/338.3 |
| 2005/0151851 | A1 | 7/2005 | Schnell | |
| 2007/0205904 | A1 * | 9/2007 | Froehner | 340/573.2 |
| 2008/0186171 | A1 | 8/2008 | Gates | |

FOREIGN PATENT DOCUMENTS

| | | |
|---|---|---|
| GB | 2315123 | 1/1998 |

OTHER PUBLICATIONS

Search Report and Written Opinion mailed on Sep. 27, 2010 for PCT/US2010/030337.

* cited by examiner

*Primary Examiner* — David P. Porta
*Assistant Examiner* — Marcus Taningco
(74) *Attorney, Agent, or Firm* — Carlson, Gaskey & Olds, P.C.

(57) ABSTRACT

A self-powered energy harvesting unit/controller receives motion data from one or more self-powered sensors via low power wire. The energy harvesting unit sends signals wirelessly to a system to perform certain functions as a result of received motion signals or the absence of such motion signals.

14 Claims, 1 Drawing Sheet

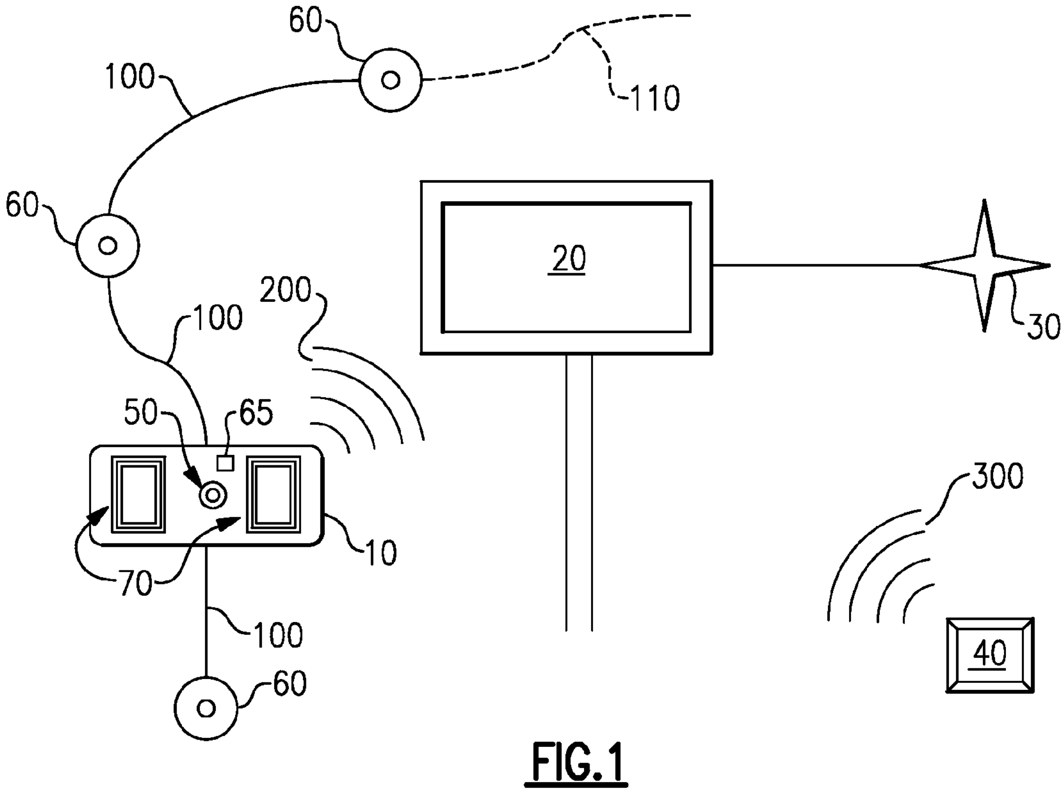
FIG.1
FIG.2
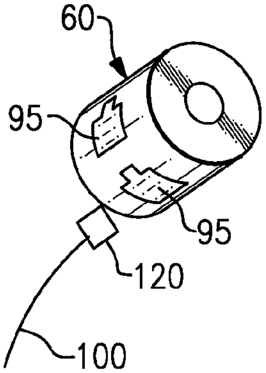

MULTIPOINT SENSING SYSTEM

BACKGROUND OF THE INVENTION

Several companies, such as Verve Living Systems, have wireless and battery-less motion-sensing products. In addition, there are several companies that provide wired and/or battery-powered motion sensing products.

SUMMARY OF THE INVENTION

According to the invention, a self-powered energy harvesting sensor/controller receives data from one or more sensors. These several sensing elements are connected to the harvesting unit by a low power cable.

According to an embodiment of the invention, the energy harvesting sensor/controller sends signals wirelessly to a system to perform certain functions as a result of received sensed signals or the absence of such signals.

Since the multipoint sensing/energy harvesting system of this invention requires no external power to operate, the number of separate sensing units needed for complete spatial coverage is minimized, especially in rooms with complicated geometry or where hardwired power dictates the location of sensors. The energy harvester is placed where light is available.

Additional sensing elements can be placed in the optimal locations for best sensing coverage. Since there is no need to keep the harvesting unit close to the sensors, the harvesting unit can be placed in an optimal location, i.e., near a constant source of light like, for instance, a continuously lit exit sign, for more efficient energy harvesting to optimize the performance of harvesting and sensing.

These and other features of the present invention can be best understood from the following specification and drawings, the following of which is a brief description.

BRIEF DESCRIPTION OF THE DRAWINGS

FIG. 1 is a schematic drawing of the multipoint sensing system of the invention.

FIG. 2 is a schematic drawing of a sensor used in the multipoint sensing system shown in FIG. 1.

DETAILED DESCRIPTION OF THE PREFERRED EMBODIMENT

Referring to FIG. 1, a multipoint sensing system of the invention is described herein. The system comprises a solar-powered wireless, battery-less harvesting and sensing unit ("HU") 10, a load controller 20, which controls a load such as an alarm, a lighting system or a communication system with an alarm company or other functions as are known in the art, a plurality of passive infrared sensors (PIR) 50, 60 or the like and a battery-less wireless switch 40 that controls the load controller 20. The PIRs 60 in this example sense motion but one of ordinary skill in the art will recognize that other sensors may be used to sense other parameters. The PIRs are dumb, unaddressed devices and only send the state of the sensing element, e.g., has motion been sensed. Communication in the system is only one-way from the PIR to the HU.

The HU 10 has one or more photovoltaic (PV) cells 70 that collect light that is converted to and stored as electrical energy to provide for the operation of controller 65 and to send motion signals to the load controller 20. One of ordinary skill in the art will recognize that the HU may also be powered by other forms of accessible energy such as heat or microwave energy among other things.

The controller 65 in HU 10 manages power collected by the PVs 70, provides power to and receives signals from the PIRs 50, 60 and sends signals to the control unit 20. The Verve Living Systems Company provides a HU 10, part number X4110. The HU 10, as noted above, may also be equipped with a PIR 50 integral therein though it is not always necessary depending on a user's needs.

The load controller 20 may be controlled by a remote manual actuator 40 to turn the load 30 on and off, or perform any other relevant function as may be necessary. Load 30 may be an alarm, a phone signaling device to inform a monitoring company, a lock down system, a lighting system or any other of a plurality of functions.

Referring to FIG. 2, each PIR 60 has a least one opening 95 for receiving a connector 120 attached to low-voltage cable 100 or 110. The connectors allow the PIRs to be connected as the constraints of a room require including branched or other shaped arrangement to the HU 10.

In operation, an installer or a user determines what areas of a structure or an environment need to be monitored for motion or other parameter. The PIRs 60 are connected to the HU 10 by means of low voltage cable 100. Typically, the harvesting unit 10 needs little light. However, the harvesting unit 10 may be placed near a window or other source of light such as exit lights in commercial buildings, or the like. If the HU 10 receives a signal that motion (or other parameter) has been sensed from any of the PIRs 60, the HU 10 sends a signal to the load controller to actuate the load 30.

Because the system operates with little power, the controller must manage the power sent to the PIRs. In one embodiment, after sensing a parameter such as motion from the PIRs and sending a signal to the load controller 20 to actuate the load 30, the HU will not send power to the PIRs for a given amount of time. For instance, if the load 30 that is activated is a lighting system, the HU will recharge its system through its cells 70 for a period of time than is less than the period of time that the load 30 (e.g., the lighting system) is programmed to be "on", thereby giving the HU time to recharge.

Because of the efficiency of the system therefore, wire is not required to connect the solar harvesting unit to the load controller 20 or an external power source. Because of the flexibility of the system, the distribution of existing (or, more importantly, non-existing) power outlets to the area to be monitored may be ignored. The sensors 50, 60 may then be arrayed in many different areas to create ideal monitoring patterns. If additional sensors are required, other sensors may be daisy-chained to the system by the convenient plug-in features 95, 120 (see FIG. 2) relating to each PIR 60. By using a constant supply of energy such as an exit light, the system is very efficient to operate as it needs no additional power.

Although a preferred embodiment of this invention has been disclosed, a worker of ordinary skill in this art would recognize that certain modifications would come within the scope of this invention. Most applications relate to intrusion/motion alarms but other applications can be imagined, such as a counting system or the like, door obstruction control, sensing a time in which a guard passes through an area, etc. For that reason, the following claims should be studied to determine the true scope and content of this invention.

What is claimed is:

1. A method of sensing motion in an area comprising;

connecting at least one sensor to an energy harvester including a controller, placing said at least one sensor in an area to be monitored for a parameter, receiving data from said at least one sensor as to a sensing of an occurrence of said parameter, placing said energy harvester close to an energy source to enable usage of said energy source and harvesting energy to power said sensor.

2. The method of claim 1 further comprising:

wirelessly sending a signal relevant to data received from said sensor to a remote location.

3. The method of claim 1 wherein said energy source is a light source.

4. The method of claim 1 wherein said energy source is a thermal source.

5. The method of claim 1 wherein energy is not sent to said sensor upon an occurrence of said parameter.

6. The method of claim 5 wherein said energy is not sent to said sensor for a given period of time.

7. A method of sensing motion in an area comprising;

connecting at least one sensor to a controller disposed in a housing, placing said at least one sensor in an area to be monitored for a parameter, providing an energy harvester on said housing, said controller receiving data from said at least one sensor as to a sensing of an occurrence of said parameter and placing said housing in a room near an energy source to enable said energy harvester to harvest energy to power said sensor, said energy being supplied by said energy harvester.

8. A multipoint sensing system disposed near a light source for sensing a parameter, said system comprising:

a single cable, a sensor connected to said cable, said sensor sensing the parameter, an energy harvester for harvesting energy from said light source, a housing for being disposed near said light source, said energy harvester being disposed on said housing, a controller disposed in said housing and connected to said cable, said controller utilizing energy from said energy harvester to power said sensor, to receive a first signal from said sensor as to an occurrence of the parameter, and to send a second signal to a location remote from said housing as a function of sensing the occurrence of the parameter.

9. The multipoint sensing system of claim 8, wherein said sensor comprises a plurality of PIR sensors each connected by said cable in series.

10. The apparatus of claim 8 wherein said sensor is not addressable.

11. The apparatus of claim 8 wherein said sensor only sends a first signal.

12. The apparatus of claim 8 wherein said controller.

13. The apparatus of claim 8 wherein said controller is configured to shut off power to said sensor after sending said second signal.

14. The method of claim 7 wherein said controller shuts off power to said sensor after sending said second signal for a given period of time.

* * * * *